United States Patent
Bickelman et al.

(10) Patent No.: US 9,208,106 B2
(45) Date of Patent: *Dec. 8, 2015

(54) FIRMWARE MANAGEMENT OF STORAGE CLASS MEMORY FOR CONNECTED OR DISCONNECTED I/O ADAPTERS

(71) Applicant: International Business Machines Corporation, Armonk, NY (US)

(72) Inventors: Craig Bickelman, Poughkeepsie, NY (US); Peter Driever, Poughkeepsie, NY (US); Steven G. Glassen, Wallkill, NY (US); Kenneth J. Oakes, Wappingers Falls, NY (US); Peter K. Szwed, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/653,970

(22) Filed: Oct. 17, 2012

(65) Prior Publication Data

US 2013/0042062 A1 Feb. 14, 2013

Related U.S. Application Data

(63) Continuation of application No. 13/157,484, filed on Jun. 10, 2011.

(51) Int. Cl.
*G06F 13/14* (2006.01)
*G06F 11/20* (2006.01)
*G06F 12/02* (2006.01)

(52) U.S. Cl.
CPC ............ *G06F 13/14* (2013.01); *G06F 11/2069* (2013.01); *G06F 11/2071* (2013.01); *G06F 12/0246* (2013.01)

(58) Field of Classification Search
None
See application file for complete search history.

(56) References Cited

U.S. PATENT DOCUMENTS

2007/0083657 A1* 4/2007 Blumenau et al. ............ 709/226
2008/0313364 A1* 12/2008 Flynn et al. ..................... 710/31

* cited by examiner

*Primary Examiner* — Edward Dudek, Jr.
*Assistant Examiner* — Ralph A Verderamo, III
(74) *Attorney, Agent, or Firm* — Cantor Colburn LLP; Steven Chiu

(57) ABSTRACT

A computer program product is provided and includes a tangible storage medium readable by a processing circuit and storing instructions for execution by the processing circuit for performing a method. The method includes detecting connections of two or more input/output (I/O) adapters, each of the two or more I/O adapters having one or more solid state devices (SSDs) connected thereto, and presenting a storage class memory address space for all of the connected SSDs that is independent of connections and disconnections between each of the one or more SSDs and each of the two or more I/O adapters and the processing unit.

7 Claims, 2 Drawing Sheets

FIRMWARE MANAGEMENT OF STORAGE CLASS MEMORY FOR CONNECTED OR DISCONNECTED I/O ADAPTERS

CROSS REFERENCE TO RELATED APPLICATION

This application is a continuation of and claims the benefit of priority to U.S. application Ser. No. 13/157,484, which was filed on Jun. 10, 2011. The entire contents of U.S. application Ser. No. 13/157,484 are incorporated herein by reference.

BACKGROUND

The present invention relates to firmware management of storage class memory.

Technologies behind solid-state nonvolatile read access memory (RAM), which are collectively referred to as storage class memory (SCM), are rapidly maturing. As a result, SCM is beginning to appear in enterprise-class mainframe servers. For example, SCM may be used as a physical replacement for mechanical-arm spinning disks with the SCM interface being similar to that of the more traditional direct access storage devices (DASDs). However, because of dramatically different performance characteristics between SCM and DASDs, new applications may use SCM more like an extended memory and would derive benefit from a mechanism that hides DASD implementation and deployment details. Also, reliability, availability and serviceability (RAS) characteristics of off-the-shelf SCM offerings may require enhancements to make them more appropriate for an enterprise-class computing environment.

SUMMARY

A computer program product is provided and includes a tangible storage medium readable by a processing circuit and storing instructions for execution by the processing circuit for performing a method. The method includes detecting connections of two or more input/output (I/O) adapters, each of the two or more I/O adapters having one or more solid state devices (SSDs) connected thereto, and presenting a storage class memory address space for all of the connected SSDs that is independent of connections and disconnections between each of the one or more SSDs and each of the two or more I/O adapters and the processing unit.

A method is provided. The method includes detecting connections of two or more input/output (I/O) adapters, each of the two or more I/O adapters having one or more solid state devices connected thereto, and presenting a storage class memory address space for all of the connected SSDs that is independent of connections and disconnections between each of the one or more solid state devices and each of the two or more I/O adapters and the processing unit.

A system for firmware management of storage class memory is provided. The system includes a processing unit in which firmware resides. The processing unit includes a tangible storage medium readable by a processing circuit and on which instructions for execution by the processing circuit are stored. The system further includes two or more input/output (I/O) adapters, each of the two or more I/O adapters having one or more solid state devices connected thereto. The firmware is configured to detect connections of the two or more I/O adapters and to present a storage class memory address space for all of the SSDs that is independent of connections and disconnections between each of the one or more solid state devices and each of the two or more I/O adapters and the processing unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Aspects of the present invention introduce a firmware abstraction layer that manages storage class memory (SCM) in, for example, an enterprise server. The invention automatically configures and manages standard SCM input/output (I/O) adapters in a manner that eliminates a single-point of failure, allows allocation of resources to multiple logical partitions and transparently balances workload across SCM devices.

Figure 1:
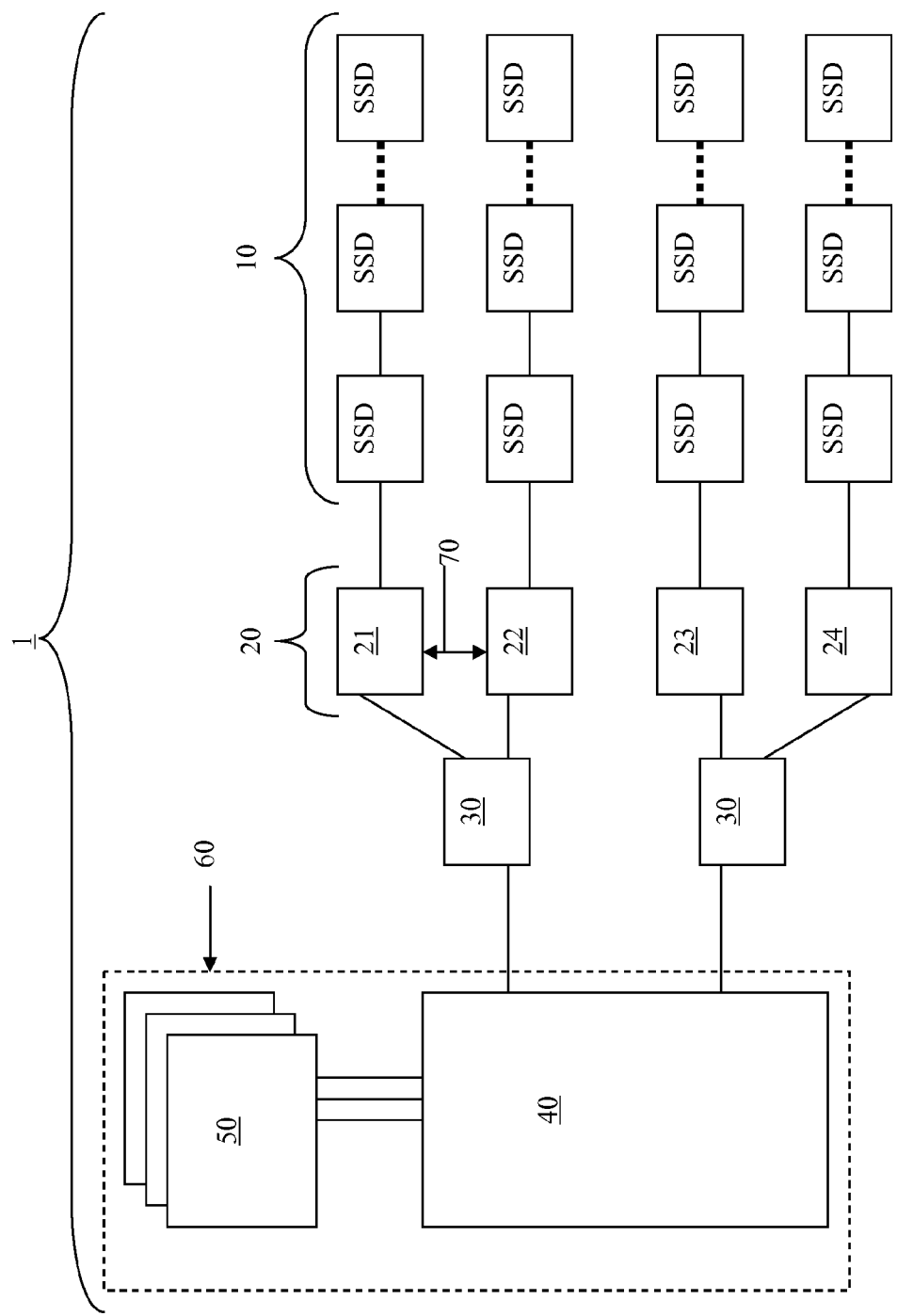
FIG. 1 is a schematic diagram of a computing device.

With reference to FIG. 1, a computing device 1, such as an enterprise computing system, is provided and it is to be understood that SCM is essentially flash memory and exhibits characteristic data persistence in the absence of a power supply. A common deployment method of SCM is in the form of solid state device (SSD) drives 10, which may be singular elements or provided as a plurality of SSD drives 10 in serial or parallel connection with I/O adapters 20. The I/O adapters 20 are physically coupled to I/O hubs 30, which are operably interposed between the I/O adapters 20 and a main memory unit 40 of the computing device 1 although it is to be understood that the I/O hubs 30 are not required and that the I/O adapters 20 can be directly coupled to the main memory unit 40. The I/O adapters 20 may be interconnected (i.e., I/O adapters 21 and 22) or independent of one another (i.e., I/O adapters 23 and 24). The main memory 40 is coupled to one or more central processing units (CPUs) and/or one or more processing circuits 50 to define a processing unit 60 on which firmware resides.

With this configuration, it is expected that the resources of the SSDs 10 will be highly utilized by many programs executing on the processing unit 60 at once. Typically, management of such utilization is achieved through the use of logical partitions for each of which its allocated resources (e.g., memory, CPU) appear to be independent and wholly owned when they may actually be implemented as a portion of a physically shared base resource. Thus, the SSDs 10 will be configured as physically shared resources with storage capacity allocated among one or more logical partitions.

To this end, micro-code is stored on the hardware of the I/O adapters 20 and defines executable instructions for carrying out certain I/O functionality, such as preparing and formatting the SSDs 10 for allocation to different logical partitions. For example, the micro-code of I/O adapter 21 defines executable instructions for forming a first volume set of memory capacity with RAID 10 protection (striped and mirrored) on space available on the SSDs 10 connected to I/O adapter 21 and the SSDs 10 connected to the I/O adapter 22. Similarly, the micro-code of I/O adapter 22 defines executable instructions for forming a second volume set of memory capacity with RAID10 protection (striped and mirrored) on space available on the SSDs 10 connected to I/O adapter 22 and the SSDs 10 connected to the I/O adapter 21. Here, it is noted that while I/O adapters 21 and 22 are physically connected by way of conduit 70, the physical connection is not necessary and it is further noted that firmware can be executed to carry out similar functionality albeit executed on the processing circuits 50.

With the micro-code stored on the I/O adapters 20 as described above, the firmware residing on the processing unit 60 serves to define an abstraction layer for managing SCM over and above that which is provided by the micro-code. For example, while the micro-code of I/O adapter 21 defines executable instructions for forming a volume set of memory capacity with RAID10 protection, the firmware defines conditions for carrying out this functionality and instructs the I/O adapter 21 to form the volume set on the SSDs 10 connected to I/O adapter 21 and the SSDs 10 connected to the I/O adapter 22. This will be described in greater detail below.

Figure 2:
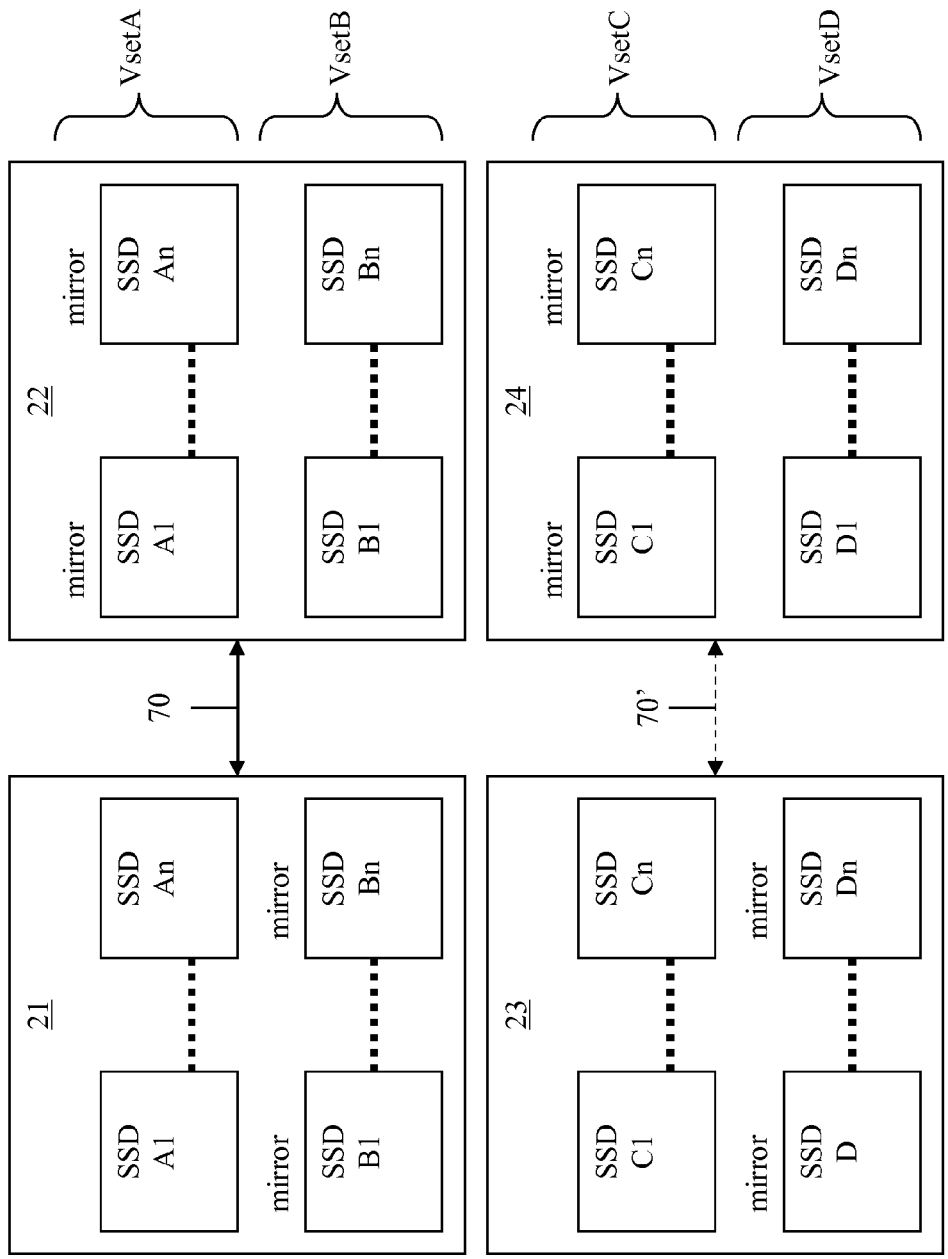
FIG. 2 is a schematic diagram of an arrangement of components of the computing device of FIG. 1.

With reference to FIGS. 1 and 2, a method for managing and accessing SCM in an enterprise computing environment such as computing device 1 is provided. The method provides for introduction of an abstraction layer by firmware residing on the processing unit 60 that automatically handles functions that would ordinarily require an administrator or programs written in a special way to account for the implementation characteristics of the SCM technology. Initiated through a special configuration function issued at the system console at installation time, the invention relates to automatic configuration of two or more of the I/O adapters 20, to each of which one or more SSDs 10 including SCM are connected and allocating the SSDs 10 into for example RAID-protected arrays independent of the physical connections or disconnections between the I/O adapters 20. The physical implementation of the method is thus hidden from the user.

In accordance with further aspects of the invention, allocation of SCM is achieved by partitioning into fixed-size increments with authorization for access to such increments being requested by user partitions. Also, the firmware residing on the processing unit 60 manages the allocation of and access to the increments, allowing only authorized partitions access to a particular increment and, when a user partition gives up authorization to access a particular increment, the firmware clears the increment storage to zero and places the increment back into a pool for allocation to another partition. Moreover, aspects of the present invention relate to the insertion of the abstraction layer of a program logical address for access to SCM to, thus, hide the corresponding I/O adapter 20 physical address. With this abstraction layer, transparent distribution of workload is made possible by striping a linear logical SCM address space across the two or more I/O adapters 20 used to access the SSDs 10.

During installation procedures, the SSDs 10 are connected to the I/O adapters 20 and the adapters 20 are coupled to the main memory 40. As noted above, the I/O adapters 20 may be connected with one another as in the case of I/O adapters 21 and 22 or they may be independent of and physically disconnected from one another as in the case of I/O adapters 23 and 24. When power is applied to the computing system 1 and the computing system 1 thereafter executes its initialization sequence, the heretofore unconfigured I/O adapters 20 are recognized by the firmware during the I/O bus walk.

Once the I/O adapters 20 are recognized, the firmware initiates, or may be directed to initiate a 'create-pair' operation to initialize the I/O adapters 20. The initialization operation is managed by the firmware and commands the I/O adapters 20 to format each of the SSDs 10 connected to the I/O adapters 20 and to group the SSDs 10 into two or more arrays that span the I/O adapters 20 and which are protected with, for example, RAID10 protection (striped and mirrored) such that each array may include a single volume set (Vset). As part of the initialization operation, the firmware further commands to I/O adapters 20 to clear the entire address space of the Vsets.

When the create-pair operation is complete, a logical distribution of the volume sets is provided. In the example of FIG. 2, where I/O adapters 21 and 22 are connected by way of conduit 70, the I/O adapter 21 will have generated Vset A spanning address spaces A1-An on the SSDs 10 connected thereto and mirrored address spaces A1-An on the SSDs 10 connected to I/O adapter 22 while the I/O adapter 22 will have generated Vset B spanning address spaces A1-An on the SSDs 10 connected thereto and mirrored address spaces A1-An on the SSDs 10 connected to I/O adapter 21. By contrast, the firmware executing on the processing unit will have generated Vset C spanning address spaces C1-Cn on the SSDs 10 connected thereto and mirrored address spaces C1-Cn on the SSDs 10 connected to I/O adapter 24 and the firmware will have generated Vset D spanning address spaces D1-Dn on the SSDs 10 connected thereto and mirrored address spaces D1-Dn on the SSDs 10 connected to I/O adapter 23. In this way, I/O adapters 23 and 24 may be initialized with a virtual connection 70' but will otherwise remain physically independent of and disconnected from one another.

Thus, aspects of the invention relate to the mapping of a flat, customer-visible SCM address spaces onto a physical implementation that is independent of the physical implementation (or lack thereof). The Vsets A and B are accessible through I/O adapters 21 and 22, respectively, on which microcode is executed that achieves the data striping and mirroring. Vsets C and D are accessible through a firmware presentation layer that achieves the data striping and mirroring.

The SCM address space is interleaved across the address spaces of the Vsets on, for example, a megabyte boundary whereby even megabyte SCM addresses are accessed through Vset A (I/O adapter 21) and odd megabyte SCM addresses are accessed through Vset B (I/O adapter 22). When multiple adapter pairs are installed, the corresponding SCM address spaces may or may not be interleaved between sets of adapter pairs. The mirroring of the arrays between SSDs 10 on separate I/O adapters 20 provides tolerance for an adapter failure and allows for a non-disruptive repair of an adapter. That is, while one adapter is unavailable due to failure, the SCM address space is served by the other adapter(s) due to the mirroring. Also, splitting the SSDs 10 into two or more arrays allows work to be split between I/O adapters.

The mapping of the SCM address space to the physical implementation (or lack thereof) is transparent to the customer, may simplify firmware design by eliminating choice and may provide for a solution that uniformly aligns with certain currently available server configurations.

In accordance with an embodiment, the SCM address space provided by all installed I/O adapters 20 may be logically divided into, for example, 16 GB increments or, more generally, increments of predefined size or sizes. The increment is the unit upon which the SCM address space is divided between logical partitions. When an increment is allocated to a partition, the firmware ensures that the partition has exclusive use of the space, and that the increment is unavailable to other partitions. When an increment is not allocated to a particular partition, but is available for allocation, the increment is placed in a free-available pool by the firmware. Increment de-allocation from a partition may be completed by the customer and, prior to placing the increment in the free-available pool, the firmware clears the contents of the increment to zero. While the increment is being cleared (a long-running operation), the increment may be accounted for in the free-unavailable pool.

Technical effects and benefits of the present invention relate to the introduction of a firmware abstraction layer that manages storage class memory (SCM) in, for example, an enterprise server. The invention automatically configures and manages standard SCM input/output (I/O) adapters in a manner that eliminates a single-point of failure, allows allocation of resources to multiple logical partitions and transparently balances workload across SCM devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   detecting connections of two or more input/output (I/O) adapters, each of the two or more I/O adapters having one or more solid state devices (SSDs) connected thereto; and
   presenting a storage class memory address space for all of the connected SSDs that is independent of connections and disconnections between each of the two or more I/O adapters,
   wherein the presenting of the storage class memory comprises:
   grouping into arrays SSDs connected to a first I/O adapter and SSDs connected to a second I/O adapter, which is physically connected to the first I/O adapter, the arrays including volume sets spanning the first and second I/O adapter and being accessible via either of the first and second I/O adapter with the SSDs connected to the second I/O adapter respectively mirroring the SSDs connected to the first I/O adapter; and
   grouping into arrays the SSDs connected to a third I/O adapter and SSDs connected to a fourth I/O adapter, which is physically disconnected from the third I/O adapter, the arrays including volume sets spanning the third and fourth I/O adapters and being accessible via firmware with the SSDs connected to the fourth I/O adapter respectively mirroring the SSDs connected to the third I/O adapter.

2. The method according to claim 1, wherein at least two of the two or more I/O adapters are physically connected.

3. The method according to claim 1, wherein at least two of the two or more I/O adapters are physically disconnected.

4. The method according to claim 1, further comprising configuring the firmware to initialize each of the two or more I/O adapters, the initialization comprising:
   formatting each of the one or more SSDs connected thereto;
   the grouping of each of the one or more SSDs into the arrays; and
   clearing an address space of the one or more volume sets.

5. The method according to claim 4, wherein each of the arrays span two or more I/O adapters.

6. The method according to claim 4, wherein each of the arrays is provided with RAID10.

7. The method according to claim 1, wherein the storage class memory space is logically divided into increments of predefined size.

* * * * *